US008671643B2

(12) United States Patent
Kristensen (10) Patent No.: US 8,671,643 B2
(45) Date of Patent: Mar. 18, 2014

(54) WIND TURBINE, A METHOD FOR ASSEMBLING AND HANDLING THE WIND TURBINE AND USES HEREOF

(75) Inventor: Jonas Kristensen, Skjern (DK)

(73) Assignee: Vestas Wind Systems A/S, Aarhus N. (DK)

( * ) Notice: Subject to any disclaimer, the term of this patent is extended or adjusted under 35 U.S.C. 154(b) by 0 days.

(21) Appl. No.: 13/564,510

(22) Filed: Aug. 1, 2012

(65) Prior Publication Data
US 2012/0306214 A1   Dec. 6, 2012

Related U.S. Application Data

(63) Continuation of application No. 11/719,978, filed as application No. PCT/DK2004/000812 on Nov. 23, 2004, now abandoned.

(51) Int. Cl.
 *E04H 12/00* (2006.01)
(52) U.S. Cl.
 USPC ........................................ 52/651.01; 52/834
(58) Field of Classification Search
 USPC .............. 52/651.01, 834, 843, 292, 296, 297, 52/167.7; 290/55
 See application file for complete search history.

(56) References Cited

U.S. PATENT DOCUMENTS

| | | | | |
|---|---|---|---|---|
| 4,068,131 A * | 1/1978 | Jacobs et al. | | 290/55 |
| 5,075,564 A * | 12/1991 | Hickey | | 290/55 |
| 6,439,832 B1 * | 8/2002 | Siegfriedsen | | 415/4.3 |
| 6,467,233 B1 * | 10/2002 | Maliszewski et al. | | 52/831 |
| 6,470,645 B1 * | 10/2002 | Maliszewski et al. | | 52/745.18 |
| 2003/0015877 A1 * | 1/2003 | Schlemenat | | 290/55 |
| 2003/0071468 A1 * | 4/2003 | Platt | | 290/55 |
| 2004/0131467 A1 * | 7/2004 | Wobben | | 416/132 B |
| 2004/0217037 A1 * | 11/2004 | O'Kane et al. | | 206/527 |
| 2005/0166521 A1 * | 8/2005 | Silber | | 52/633 |
| 2009/0159477 A1 * | 6/2009 | Livingston et al. | | 206/443 |

FOREIGN PATENT DOCUMENTS

CA        2513303 A1 *   2/2004   ............. F03D 11/00

* cited by examiner

*Primary Examiner* — Branon Painter
(74) *Attorney, Agent, or Firm* — Wood, Herron & Evans, LLP (57) ABSTRACT

The invention relates to a wind turbine including a foundation and a tower positioned on the foundation where the tower includes more than one modules, where the modules each include a separate strengthening structure defining the outer edges of the module and wind turbine equipment, and where the more than one module are positioned substantially vertically on top of each other in an upright position within the tower. The modules are connected directly and/or indirectly through the strengthening structure, to the foundation. The invention further relates to a method for assembling a wind turbine at a wind turbine site and a method for handling more than one wind turbine modules.

10 Claims, 6 Drawing Sheets

WIND TURBINE, A METHOD FOR ASSEMBLING AND HANDLING THE WIND TURBINE AND USES HEREOF

CROSS-REFERENCE TO RELATED APPLICATIONS

This application is a continuation of U.S. patent application Ser. No. 11/719,978 filed Jun. 22, 2007 (pending) which is a U.S. National Phase of International patent application PCT/DK04/00812 filed on Nov. 23, 2004 (expired) which designated the United States. The content of all prior applications is incorporated herein by reference.

BACKGROUND OF THE INVENTION

The invention relates to a wind turbine as described below, a method for assembling the wind turbine and a method for handling the wind turbine and uses hereof

DESCRIPTION OF THE RELATED ART

A wind turbine known in the art typically comprises a wind turbine tower and a wind turbine nacelle positioned on top of the tower. A wind turbine rotor, comprising three wind turbine blades, is connected to the nacelle through a low speed shaft, which extends out of the nacelle front as illustrated on FIG. 1.

The nacelle is typically provided with some, but typically not all, of the electrical equipment needed to transform, convert and in other ways handle the power being produced by the generator in the nacelle. With off-shore and land based wind turbines the rest of this power handling equipment is often placed on platforms inside the wind turbine tower. These platforms are typically mounted on fittings welded to the inside of the tower, usually close to the bottom of the tower. With land based wind turbines the rest of this power handling equipment can also be placed in a separate house outside the wind turbine The wind turbine tower has to stand stress produced from both the weight of the wind turbine itself and the torque created by the wind pressure on the wind turbine blades and on the tower itself. Especially at the bottom of the tower the concentration of stress is high.

Any kind of welding on the tower is critical in that it reduces the towers fatigue limit and because the stress on the tower is highest at the bottom, welding is especially critical here.

Another problem in mounting power handling equipment on platforms at the bottom of the tower is that it is inflexible, in that the platforms only fit towers of a specific diameter, and in that mounting and fitting of the platforms and the power handling equipment can first take place when the tower is manufactured and painted.

WO 2004/067959 discloses different techniques for providing equipment in a wind turbine tower, where the equipment is positioned as one common unit on the foundation of the wind turbine tower.

The unit may comprise a complicated system including a plurality of different rooms such as room for power equipment, changing room, room for accommodation or other.

The unit is difficult to handle and transport in that it is large and heavy, and all the equipment in the unit has to be secured thoroughly, in that it has to be transported lying down and An object of the invention is to provide for a wind turbine with equipment positioned in the tower in a simple and space efficient way then erected at the mounting site.

An object of the invention is to provide for a wind turbine with equipment positioned in the tower in a simple and space efficient way.

A further object of the invention is to establish an advantageous logistical system for providing a wind turbine tower with wind turbine equipment and to avoid reducing the towers fatigue limit when doing so.

The Invention

The invention provides for a wind turbine wherein the tower includes more than one modules, said more than one module each comprising a separate strengthening structure substantially defining outer edges of the module and wind turbine equipment, wherein said more than one module are positioned substantially vertically on top of each other in an upright position within said tower, and connected directly and/or indirectly through said strengthening structure, to said foundation.

By providing a wind turbine tower with several modules containing wind turbine equipment, a flexible way of implementing equipment in a wind turbine is achieved.

In an embodiment of the invention one module could contain a cable for connecting the power equipment in the nacelle positioned on top of the wind turbine tower with the power equipment in one or more of the modules positioned in the tower. Another module could be provided with a transformer and an inverter. A third module could be provided with a PLC and/or a PC for controlling and surveillance purposes. In an embodiment of the invention further modules could be used for storing spare parts or be provided with other power handling equipment. In an off-shore based wind turbine a module for accommodation could advantageously be provided. Depending on where the wind turbine is mounted other embodiments of the modules could be provided for.

By providing each module with separate strengthening structure each module can be fitted, stored, transported, mounted and other independently of the other modules which is logistically very advantageous.

Another advantage of using modules with separate strengthening structure for providing a wind turbine with equipment is that when stacked, the modules are substantially self carrying and self supporting. This way no connections reducing the towers fatigue limit is needed.

As the height of the tower is always considerably larger than the diameter it is advantageously to place the modules upright substantially vertically on top of each other, so that the modules use the space available in the tower as efficient as possible.

It is advantageously to place the modules inside the tower in that there they are protected against the fury of the elements, and the cost of building a separate house for the equipment is saved.

By placing the first module on the foundation either directly or on some sort of fittings casted into the foundation, and connecting the module to the foundation the module stack is made stable. And by connecting the further modules to the first module the stack is made even more stable.

In an aspect of the invention, at least two of said more than one modules comprises substantially different wind turbine equipment.

As previously argued one of the great advantages of providing equipment in modules, is that the modules can contain all kinds of wind turbine equipment which easily can be combined to suit the requirements of a specific wind turbine.

In an aspect of the invention, said wind turbine equipment is pre-fitted into said more than one module e.g. at the wind turbine manufacturing plant.

By pre-fitting the modules with equipment e.g. at the wind turbine manufacturing plant, the modules can be put on stock, and when a specific wind turbine is to be mounted the different modules needed for this wind turbine can easily be retrieved and put together at the mounting site.

By making pre-fitted modules which can be used in a variety of different wind turbine types, it is also possible to optimise the use of the productions facilities, in that the pre-fitted modules can be put on stock, which then can function as a production buffer to level out any variation in demand.

Another advantage of pre-fitting the modules is that they can be pre-fitted at different locations. An accommodation module could e.g. be fitted at a sub-contractor such as a carpenter, or at a department at the wind turbine manufacturing plant especially provided for fitting accommodation modules. Power handling modules could be fitted in an electric workshop and so on. In this way the pre-fitting of the different modules can be done parallel, which reduces both transportation and the total production time.

In an aspect of the invention, said strengthening structure has the shape of a rectangular parallelepiped.

Making the modules strengthening structure in a substantially cubical shape is advantageous in that, the substantially cubical shape makes the modules easy to manufacture, transport, handle, store and other. The modules could e.g. be of a size that made them fit into a standard ISO container e.g. 20, 30 or 40 foot, which would simplify transport of the modules.

In an aspect of the invention, said rectangular parallelepiped shaped strengthening structure comprises a top and a bottom part each comprising four rails constituting the outer edges, and said top and bottom part being separated by a substantially vertical corner post placed in each of the four corners of said top and bottom part.

Making the substantially cubical shaped strengthening structure out of rails and posts substantially defining the outer edges is advantageous in that, the structure can be made of straight material and in that this provides for an efficient use of material.

In an aspect of the invention, said rails of said top and bottom part and said corner posts are made of steel beams and/or steel tubes.

Steel beams and/or steel tubes are relatively inexpensive and steel is a strong and rigid material. These qualities make steel beams and/or steel tubes advantageous in that, it provides for a relatively cost and weight efficient way of providing modules with strengthening structure.

In an aspect of the invention, said more than one modules are standardised ISO containers e.g. made of steel.

Standardised ISO containers are easy transportable, in that the ISO container system is well known and used all over the world. By making the modules out of standardised ISO containers they become easy to store, transport, handle and inexpensive to manufacture, and steel is a strong, rigid and relatively inexpensive material and therefore the preferred material for making containers.

In an aspect of the invention, said equipment of said more than one modules is confined inside the modules.

By placing the equipment inside the modules the modules becomes substantially uniform. This makes them easy to store, transport and handle in general.

In an aspect of the invention, in at least two of said more than one modules, said equipment of said at least two modules are mechanically and/or electrically connected.

When the modules are placed in the wind turbine they can advantageously be connected either mechanically or electrically or both. One module could e.g. be pre-fitted with a personnel lift provide with a rail or a rack which could be joined with a similar rail or rack in other modules to enable the operation of the lift in or through the other modules.

Power handling equipment in different modules could also advantageously be connected across the modules.

In an aspect of the invention, one of the more than one modules is positioned in a way that the floor of said one module is substantially level with the bottom of the door in the wind turbine tower.

By positioning a module in this way the module can be pre-fitted with a entrance platform enabling easy access from the tower door to the module.

In an aspect of the invention, at least one of said more than one modules comprises cable winding means.

The power handling equipment in the nacelle could in a preferred embodiment of the invention be connected to the equipment in the modules. It would therefore be advantageously to pre-fit a module, preferably the bottom module, with cable winding means and a cable to be unwound, when the wind turbine is fully erected, to establish said connection.

In an aspect of the invention, one or more of said more than one modules has one or more support connections, connected to said wind turbine tower in a way, which does not substantially reduce said towers fatigue limit.

To secure the stability of the module stack it could be advantageously in an embodiment of the invention to provide one or more modules with one or more support connections. These support connections could be made as e.g. arms pressing against the inside of the tower. In this way the towers fatigue limit is not affected.

In an aspect of the invention, said one or more support connections abuts the inside surface of said wind turbine tower.

By just touching the inside surface of the tower, the support connections does not reduce the towers fatigue limit.

In an aspect of the invention, said strengthening structure of said more than one modules being identical.

By making the strengthening structure identical the modules becomes easy to manufacture, transport, handle and store in that, they more or less can be manufactured, transported, handled and stored in the same way. Furthermore when the modules are placed on top of each other, the corner posts of the strengthening structure can absorb the load of modules above, which makes the modules easy to stack.

The invention further provides for a method for assembling a wind turbine at a wind turbine site said method comprising the steps of, establishing said foundation for said wind turbine, positioning a first module comprising a strengthening structure and wind turbine equipment on said foundation, connecting said first module directly and/or indirectly to said foundation, positioning one or more further modules comprising a strengthening structure and wind turbine equipment on top of said first module, and connecting said first module to said further modules.

By placing the first module on the foundation either directly or on some sort of fittings casted into the foundation, and connecting the module to the foundation the module stack is made stable. And by connecting the further modules to the first module the stack is made even more stable.

The advantage of using modules for providing a wind turbine with equipment in the tower is, that with e.g. an off-shore based wind turbine park comprising a plurality of wind turbines, it would some times only be necessary to provide only one wind turbine with accommodation, only one other wind turbine could be provided with a stock module and only one other wind turbine could be provided with a common surveillance module. Compared to having all the equipment for a specific wind turbine type in only one module the multiple module system provides an easy solution for providing several wind turbines of the same type with different equipment.

Another advantage of providing the wind turbine with equipment in modules is that the tower and the modules can be manufactured, stored and transported separately, which logistically is a great advantage, in that it reduces production time and costs of transportation. The tower do not have to be manufactured and painted before the fitting of equipment can take place, and the tower and the different modules do not have to be brought together before the mounting of the wind turbine at the wind turbine site.

An aspect of the invention provides for a method for assembling a wind turbine wherein said method includes establishing the wind turbine tower around the more than one modules by hoisting the tower as a whole or as sections down over the more than one modules and connecting said tower to said foundation.

If the tower is pre-fabricated as a whole or more commonly is divided into sections it is advantageous to hoist the tower or tower sections down over the module stack after the stack has been placed.

An aspect of the invention provides for a method for assembling a wind turbine, wherein said method includes establishing the wind turbine tower around the more than one modules by assembling more than one tower shells around the more than one modules and connecting said shells to each other and to said foundation.

WO 2004/083633 illustrates that by making the tower or tower sections out of e.g. three shell, the tower can be made of a larger diameter than what would be possible to transport, if the tower or tower sections was just tubes. Placing these shells around the module stack can be done relatively easy, in that the crane or the like used for erecting the wind turbine, does not have to carry as much weight or lift as high as if the tower was a complete tube.

An aspect of the invention provides for a method for assembling a wind turbine, wherein said wind turbine equipment in at least two of said more than one modules are mechanically and/or electrically connected.

An aspect of the invention provides for a method for assembling a wind turbine, wherein one of said more than one modules is positioned in a way that the floor of said one module is substantially level with the bottom of the door in said wind turbine tower.

An aspect of the invention provides for a method for assembling a wind turbine, wherein said wind turbine equipment is pre-fitted into said more than one module e.g. at the wind turbine manufacturing plant.

An aspect of the invention provides for a method for assembling a wind turbine, wherein at least two of said more than one modules comprises substantially different wind turbine equipment.

An aspect of the invention provides for a method for assembling a wind turbine, wherein one or more of said more than one modules has one or more support connections connected to said wind turbine tower in a way which does not substantially reduce said towers fatigue limit.

An aspect of the invention provides for a method for assembling a wind turbine, wherein said one or more support connections abuts the inside surface of said wind turbine tower.

The invention further provides for a method of handling more than one wind turbine modules said method comprising the steps of, establishing a strengthening structure in each of said more than one modules, and fitting said more than one modules with wind turbine equipment, where the handling of said more than one modules are preformed in such a way that said modules are substantially upright during fitting of wind turbine equipment, transport and/or assembling at the wind turbine site.

By providing the wind turbine with equipment in modules it is made possible to keep the modules substantially upright at all times after the modules has been fitted with the equipment. This is a great advantage in that some of the equipment such as e.g. the cable, the transformer or other is quit heavy and would have to be secured very thoroughly in order not to be damaged if the modules was to be lied down. Other equipment in the modules could be delicate electrical equipment, which could easily be damaged if the modules were e.g. transported lying down on one side.

FIGURES

The invention will be described in the following with reference to the figures in which FIG. 1. illustrates a large modern wind turbine.

DETAILED DESCRIPTION

Figure 1:
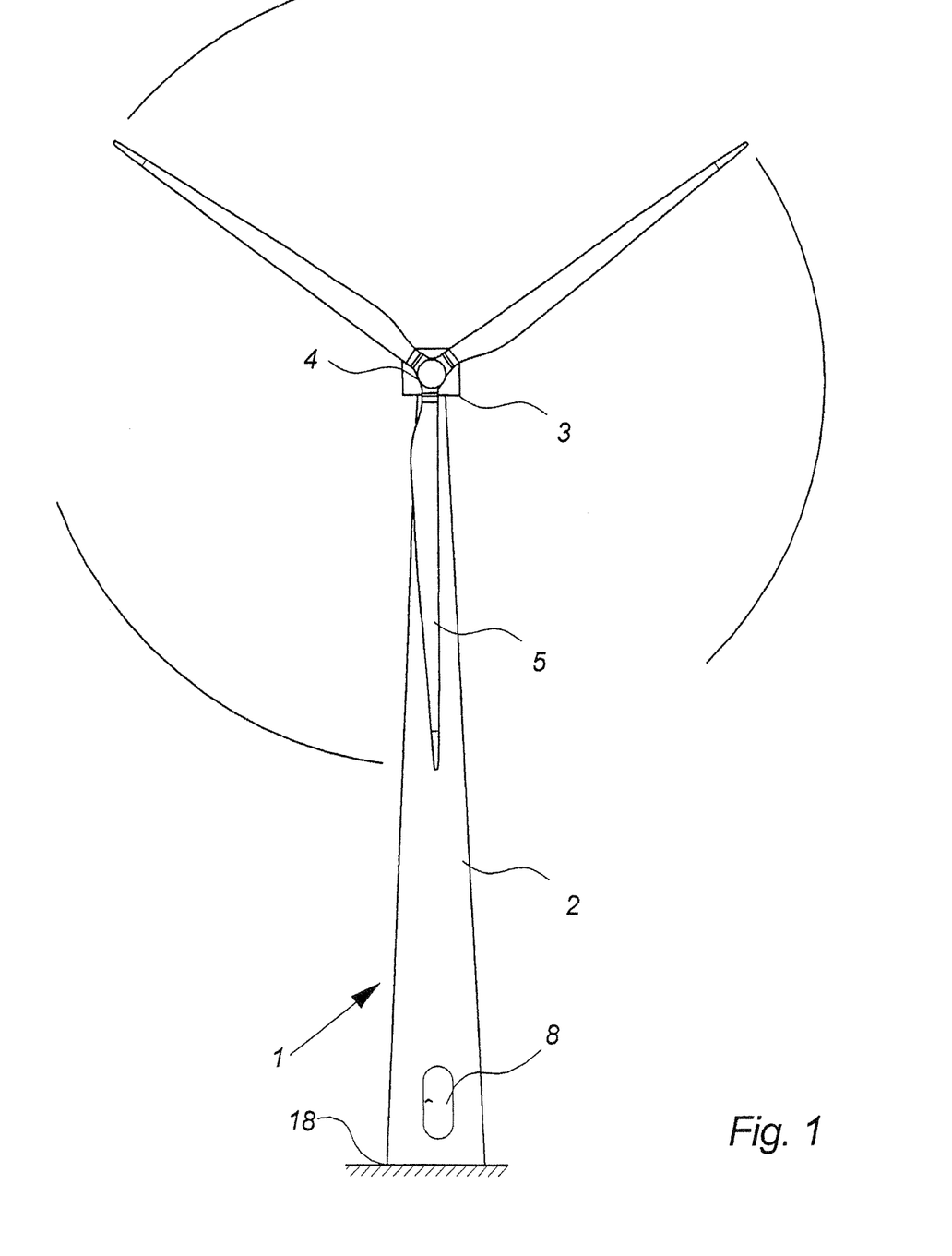

FIG. 1 illustrates a modern wind turbine 1 mounted on the foundation 18 comprising a tower 2 with a door 8 and a wind turbine nacelle 3 positioned on top of the tower 2. The wind turbine rotor 4, comprising three wind turbine blades 5, is connected to the nacelle 3 through the low speed shaft which extends out of the nacelle 3 front.

The different components of a wind turbine 1 are usually transported separately to the site of mounting and assembled there e.g. the different tower sections, the nacelle 3 and the wind turbine blades 5.

The wind turbine may e.g. be an off-shore wind turbine.

Figure 2:
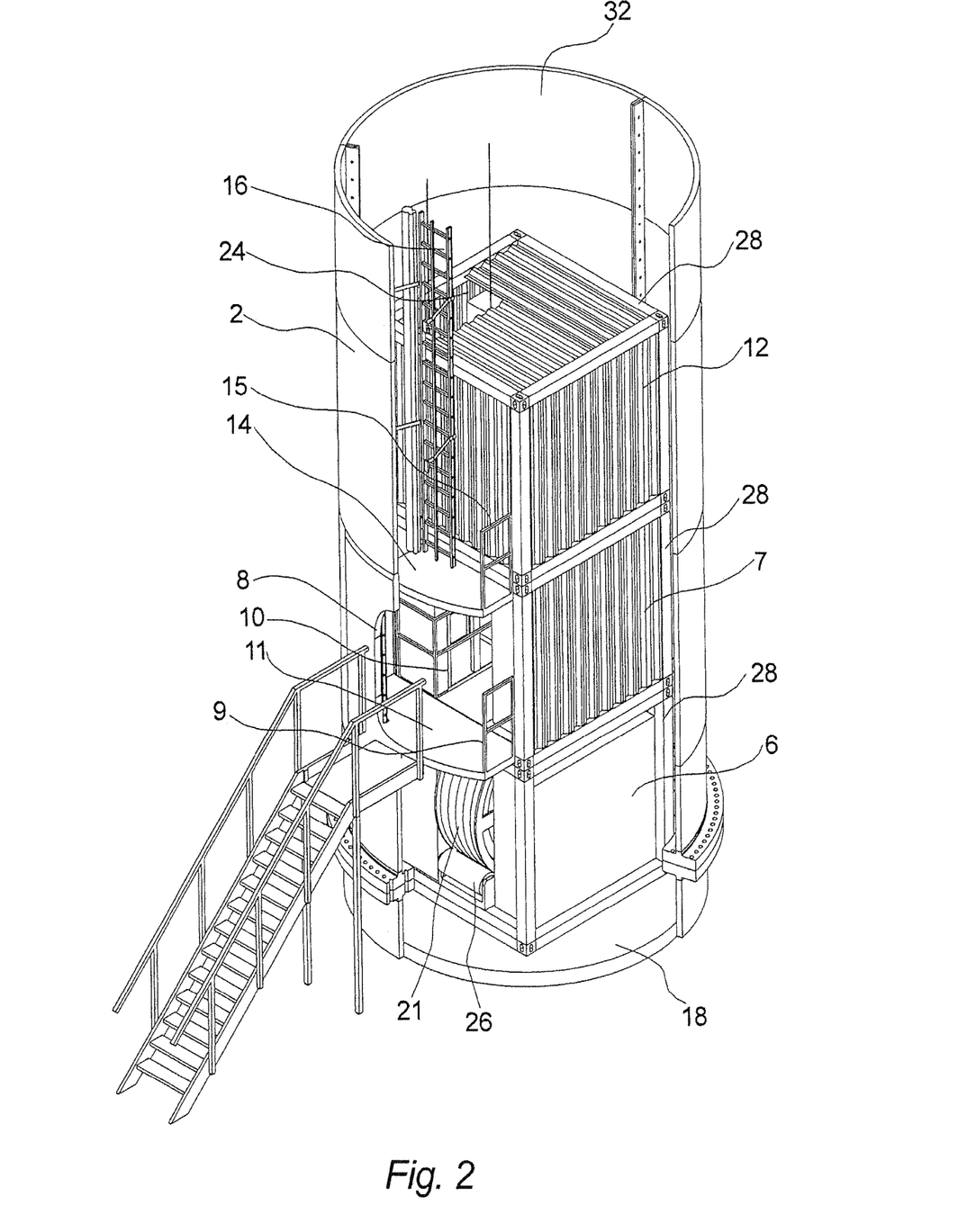
FIG. 2 illustrates in perspective a wind turbine tower provided with equipment containers.

FIG. 2 illustrates in perspective a wind turbine tower 2 with a section cut-off so it is possible to see inside the tower 2. In this embodiment of the invention three equipment modules are placed on the wind turbine foundation 18 inside the tower 2. A cable module 6 is positioned at the bottom and is somehow connected to the foundation 18. The cable module 6 at the bottom could be placed directly on top of the foundation 18 and connected by means of e.g. anchor bolt, or some sort of platform or fitting could be casted into or connected to the foundation 18, and then the modules are placed and secured to this platform or fittings.

In this embodiment of the invention an entrance module 7 is placed on top of the cable module 6, and the modules 6, 7 are connected by means of e.g. fittings, bolt, screws, welding or other.

In this embodiment of the invention the entrance module 7 is provided with an entrance platform 11 provided with a guard rail 9 at the sides. The entrance platform 11 could be hinged to the entrance module 7, so that it could be tilted into the module 7 during stock, transport etc.

As illustrated on FIG. 2 the entrance module 7 could be provided with a personnel lift 10, to bring people or equipment up to the nacelle 3 or up or down to the other equipment modules. The rail or rack to guide this lift could also be pre-fitted into the other modules and the inside the tower 2, to be joined as one long rail or rack after the erection of the tower 2.

The different modules could be provided with a fence 13 around the lift. This fence 13 could in each module be provided with a locked door, so that only authorized personnel could gain access to the different modules by use of a key, an authorization code or other.

In this embodiment of the invention an electrical equipment module 12 is placed on top of the entrance module 7, and the modules 12, 7 are connected by means of e.g. fittings, bolt, screws, welding or other.

The entrance module 7 below the electrical equipment module 12 is at the top provided with another platform 14 provided with a guard rail 15 at the sides. The platform 14 could be hinged to the top of the entrance module 7, so that it could be tilted into the entrance module 7 during transport. This platform 14 could both function as a place to stand when using the ladder 16, and as protection from falling object when entering the tower 3 through the door 8.

In another embodiment of the invention the wind turbine 1 could be provided with another number of equipment modules e.g. two, four or more, and the modules could be placed in another order and have other functions than the shown e.g. accommodation, stock, workshop or other.

In this embodiment of the invention the different modules strengthening structure 28 are identical. In another embodiment of the invention the structure 28 could be of different size. For example could the modules be of decreasing size upwards to efficiently utilize the space available in a conical tower.

FIG. 2 also illustrates that the tower could be made of a number of shells 32 and in this embodiment of the invention, three shells 32. These shells 32 could have the full length of the tower 2 or they could be divided into a number of sections, together constituting the full tower 2. The shells 32 could be joined at the wind turbine mounting site by erecting a first shell and connecting it to the foundation 18 by connecting means such as screws, bolts, welding or other. A second and a third shell are then erected and positioned beside the first shell. The second and the third shell are connected to the foundation, to the first shell and to each other by connecting means.

Figure 3:
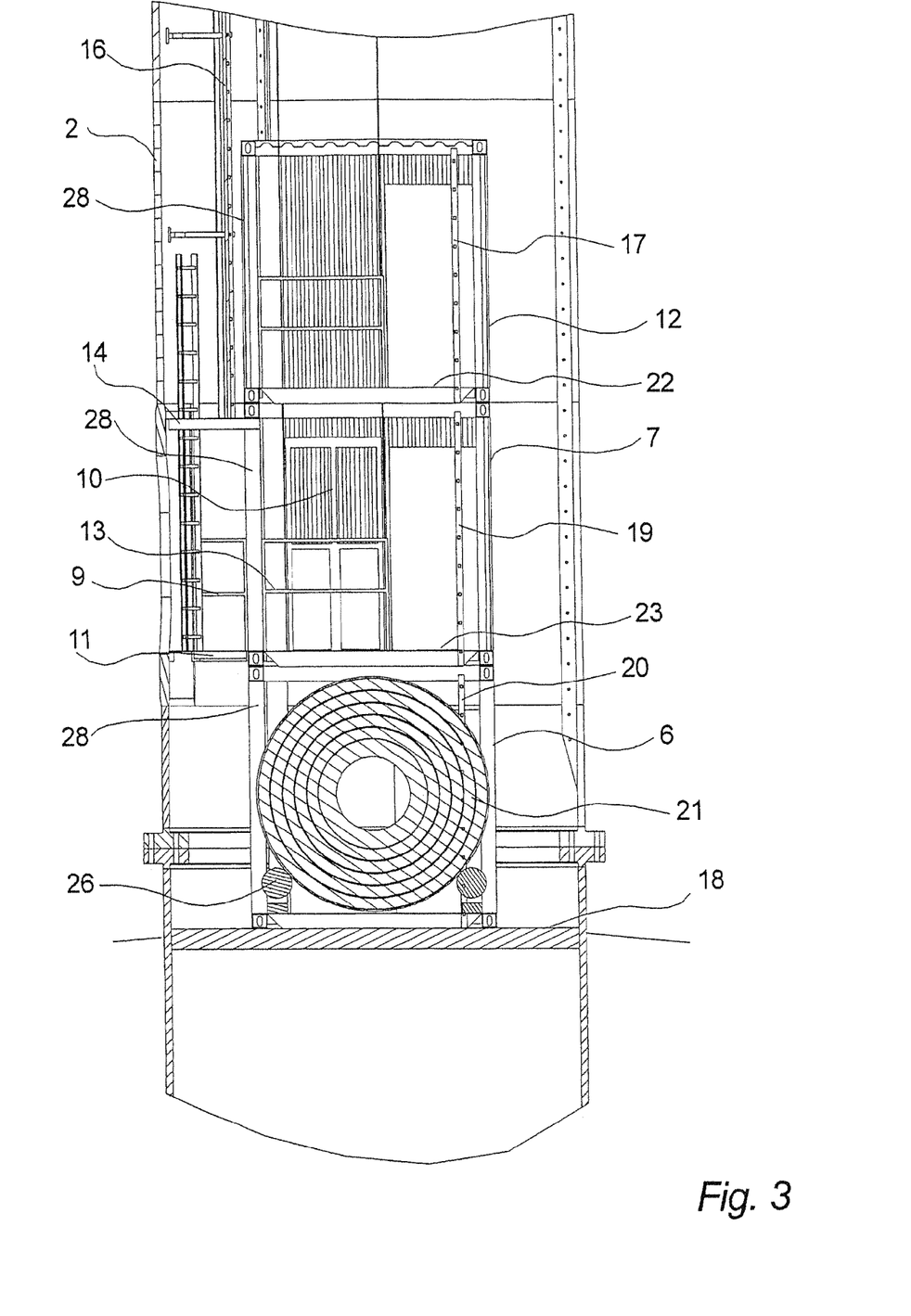
FIG. 3 illustrates a vertical cross section of a wind turbine tower.

FIG. 3 illustrates, in a vertical cross section through the middle of the tower 2, the same embodiment of the invention as illustrated on FIG. 2. In this embodiment of the invention the back of the modules are provided with ladders 17, 19, 20 to enable manual access between the different modules. The floor or the ceiling of the different modules could be provided with a hatch 22, 23, which could be locked to ensure that only authorized personnel could gain access.

In this embodiment of the invention the cable module 6 at the bottom is provided with cable winding means 26 and a cable 21 to connect the power handling equipment in the nacelle 3 with the power handling in one or more of the modules 6, 7, 12.

Figure 4:
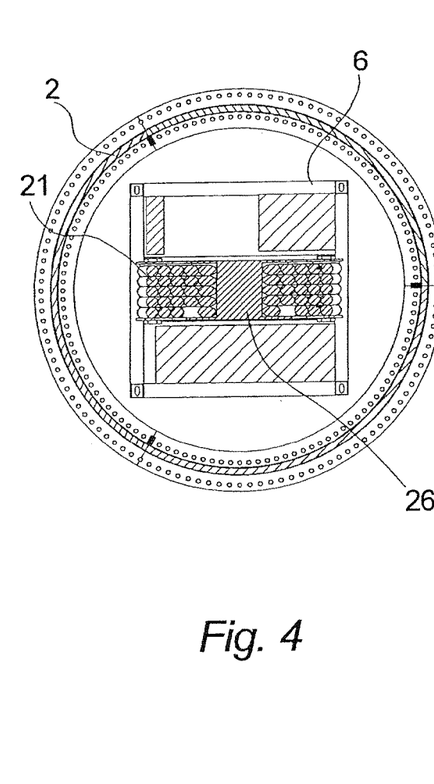
FIG. 4 illustrates a horizontal cross section of a wind turbine tower through a cable container.

FIG. 4 illustrates in an embodiment of the invention a horizontal cross section of the tower 2 through the middle of the cable module 6.

Figure 5:
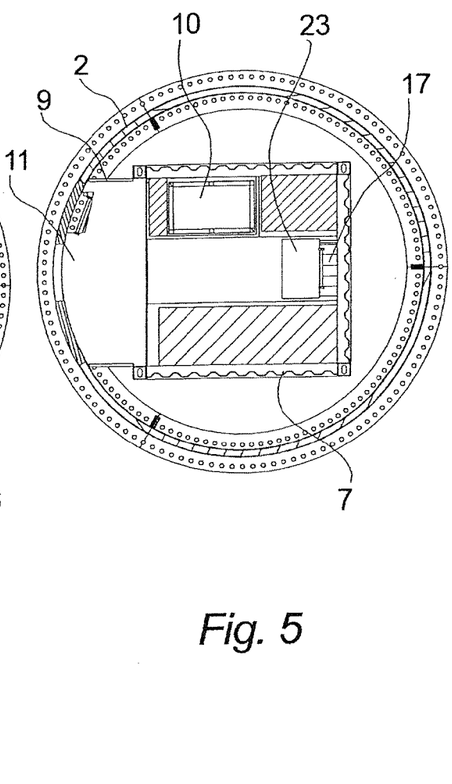
FIG. 5 illustrates a horizontal cross section of a wind turbine tower through an entrance container.

FIG. 5 illustrates in an embodiment of the invention a horizontal cross section of the tower 2 through the middle of the entrance module 7.

Figure 6:
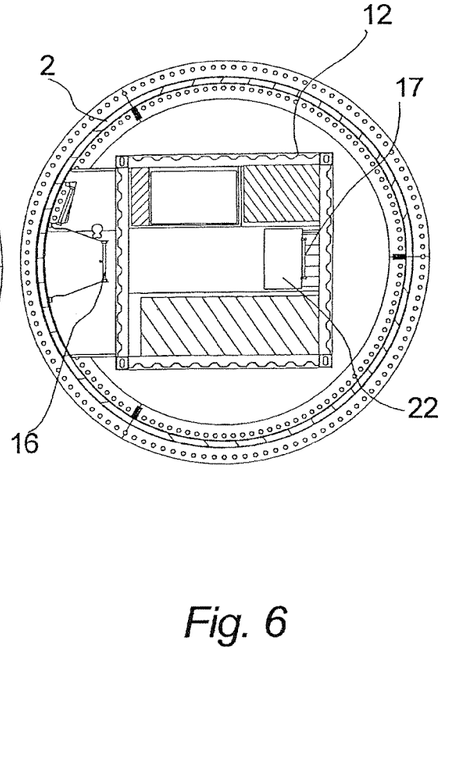
FIG. 6 illustrates a horizontal cross section of a wind turbine tower through an electrical equipment container.

FIG. 6 illustrates in an embodiment of the invention a horizontal cross section of the tower 2 through the middle of the electrical equipment module 12.

Figure 7:
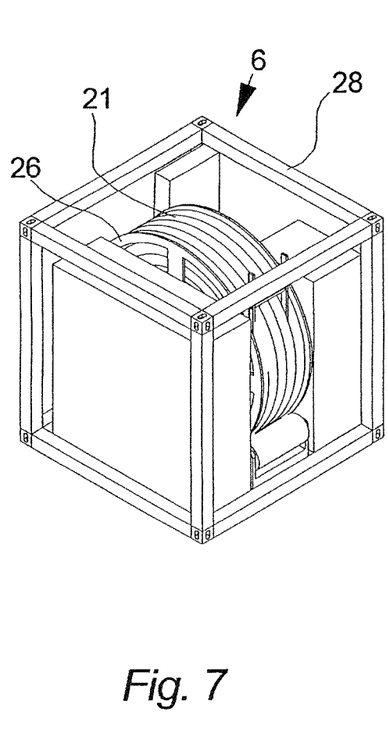
FIG. 7 illustrates in perspective a cable container.

FIG. 7 illustrates a cable module 6 in perspective. In this embodiment of the invention the module 6 is not provided with plates on the sides and on the top to enable access to the inside from all sides. During transport and if the cable module 6 is put on stock after being pre-fitted, the cable module 6 could be provided with some sort of temporary plates on the open sides and the top to shield the equipment inside the cable module 6.

In this embodiment of the invention the cable module 6 and the other module has the form of a standard 8 foot ISO container comprising a strengthening structure 28 made of tubes, preferably steel tubes defining the outer edges of the module. In another embodiment of the invention the modules could still have the shape of a rectangular parallelepiped but they could be of a size smaller than an 8 foot container so they would fit into e.g. a standard 40 foot container, and the strengthening structure could be made of e.g. steel beams.

In this embodiment of the invention the cable module 6 is provided with cable winding means 26 provided with a cable 21. When the cable module is in position inside the wind turbine 1 the cable 21 can be unwound to establish an electrical connection between the nacelle 3 and one or more of the modules.

Figure 8:
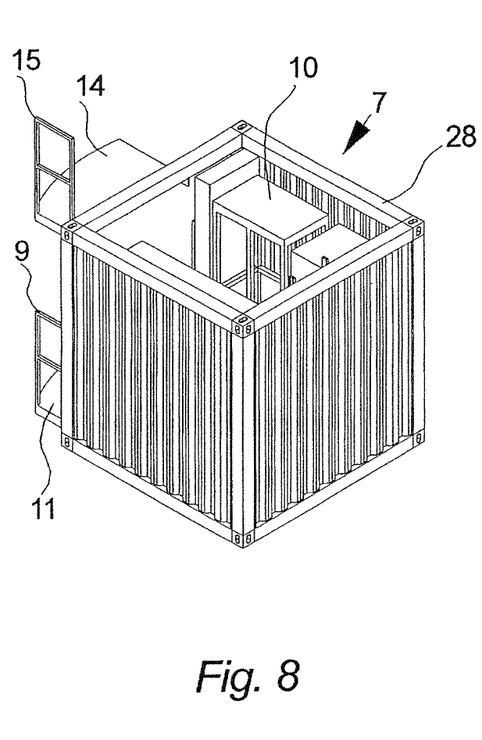
FIG. 8 illustrates in perspective an entrance container.

FIG. 8 illustrates an entrance module 7 in perspective. In this embodiment of the invention the entrance module 7 is not provided with a roof, in that the floor of the electrical equipment module 12 functions as a roof, when the electrical equipment module 12 is placed on top of the entrance module 7.

Figure 9:
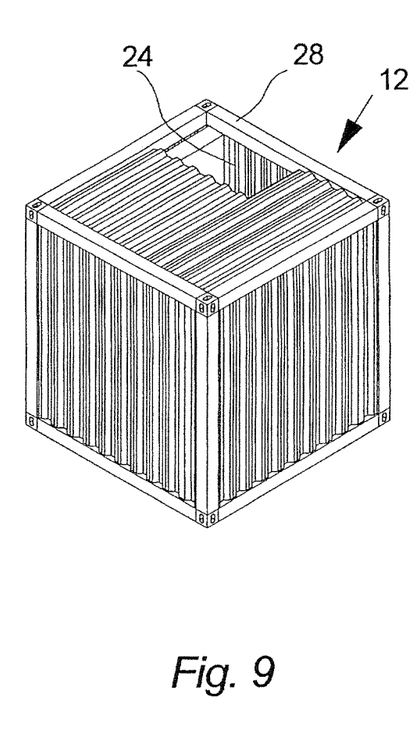
FIG. 9 illustrates in perspective an electrical equipment container and FIG. 10 illustrates a vertical cross section of a wind turbine tower.

FIG. 9 illustrates an electrical equipment module 12 in perspective. In this embodiment of the invention the electrical equipment module 12 is closed on all sides by plates, which are connected to the beams by connection means such as screws, bolts or preferably welding during the manufacturing of the module 12. The electrical equipment module 12 is in this embodiment of the invention provided with an aperture 24 in the ceiling to allow the lift 10 to pass through. This aperture 24 and other apertures in this and other modules could be made during manufacturing of the modules at the wind turbine manufacturing plant. The aperture 24 could then be temporary covered by covering means such as plates, tarpaulins or other, during stock and/or transport. The apertures could also be made at the or close to the wind turbine mounting site.

Figure 10:
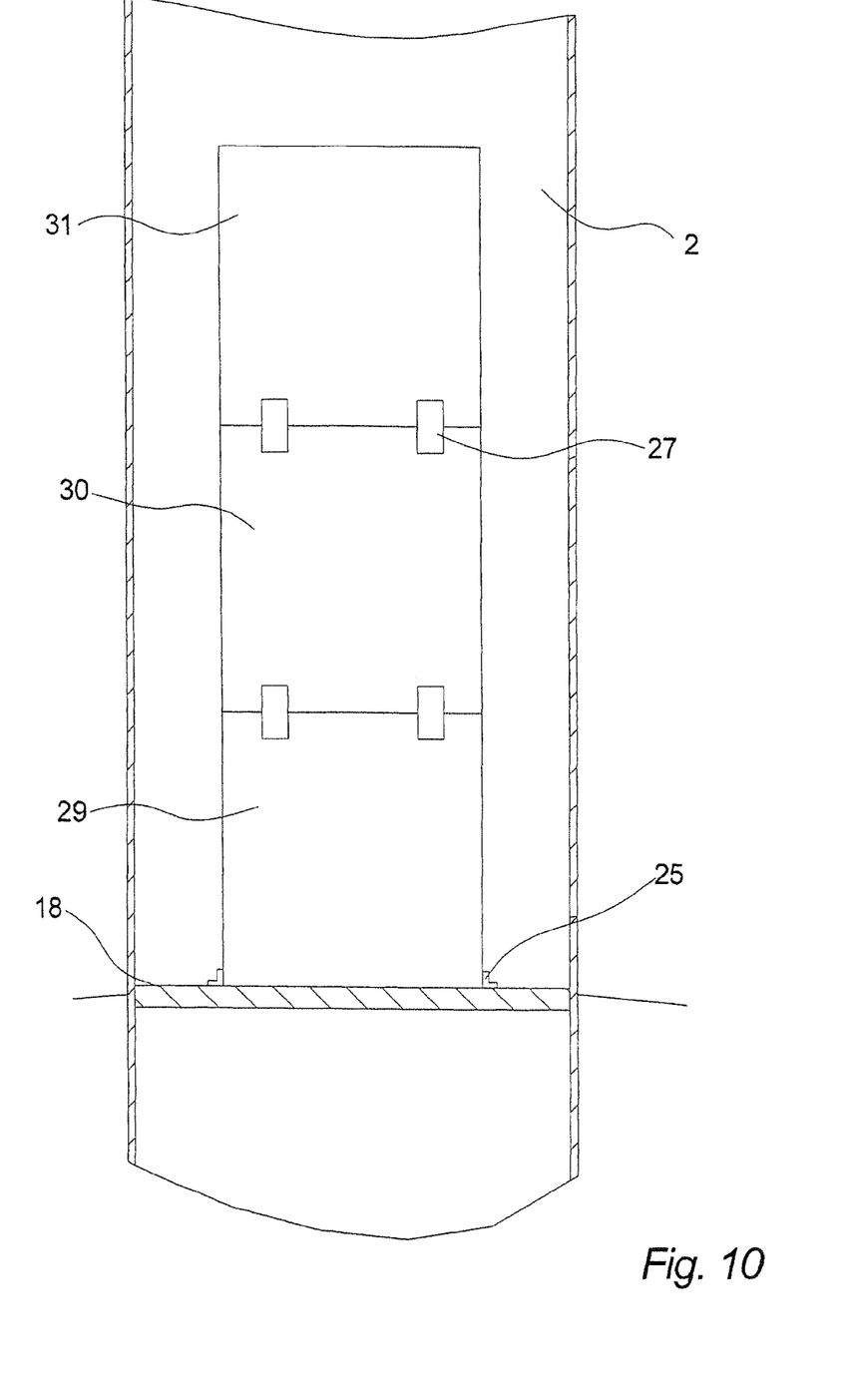

FIG. 10 illustrates a vertical cross section through the middle of the tower 2. In this embodiment of the invention a bottom module 29 is placed at the bottom and connected to the foundation 18 by means of foundation fittings 25. The foundation fittings 25 could be connected to the foundation by means of e.g. anchor bolt casted into the foundation 18. The foundation fittings 25 could be connected to the bottom module 29 by means of screws, bolts, welding or other. The bottom module 29 could also be connected to the foundation 18 in the area being covered by the bottom module 29 e.g. by means of screws, bolts or other directly through holes in the strengthening structure 28 or special incorporated fittings.

In this embodiment of the invention the other modules 30, 31 are connected to each other and to the bottom module 29 by means of module fittings 27. These module fittings 27 are connected to the modules by means for screws, bolts, welding or other. In another embodiment of the invention the modules could be connected directly e.g. by bolts or screws through the strengthening structure 28 or other places, or by welding the modules together. In another embodiment of the invention the modules could be made in such a way that they included centering means, so that when they are stacked the centering means would ensure that the modules were positioned correctly on the foundation 18 and/or on top of each other.

What is claimed is:

1. A tower construction for a wind turbine, the wind turbine comprising a set of blades and a nacelle enclosing at least a transmission system and power generating means, the tower construction comprising:
   a first structure being structurally self-supporting and adapted to support the blades, the nacelle and parts enclosed by the nacelle, said first structure defining a longitudinal direction, and said first structure having at least one wall part extending along the longitudinal direction, and
   a second structure being structurally self-supporting and adapted to carry one or more components of the wind turbine, said second structure being arranged along the longitudinal direction defined by the first structure, and said second structure extending along at least a substantial part of the length of the first structure in the longitudinal direction,
   wherein the first structure and the second structure are positioned relative to each other in such a manner that no fixed connections between the second structure and the at least one wall part of the first structure are formed;
   wherein the first structure and the second structure are positioned relative to each other in such a manner that any connections provided between the second structure and the at least one wall part of the first structure exert no connection force capable of resisting movement of the second structure away from the at least one wall part of the first structure; and
   wherein said first structure and said second structure are positioned relative to one another in such a manner that support connections on said second structure just touch an inside surface of said first structure to define abutting contact that does not affect the fatigue limit of said first structure.

2. The tower construction according to claim 1, wherein the second structure is arranged in an interior part of the first structure.

3. The tower construction according to claim 1, wherein the first structure forms an at least substantially closed part.

4. The tower construction according to claim 1, wherein the second structure forms a grid-like part.

5. The tower construction according to claim 1, further comprising at least one wind turbine component, wherein the at least one wind turbine component is pre-mounted on the second structure.

6. The tower construction according to claim 1, wherein the second structure is adapted to at least substantially enclose one or more parts which need to be moved along the longitudinal direction defined by the first structure.

7. The tower construction according to claim 1, wherein the tower construction is formed by a number of individual tower sections, each tower section comprising a first structure section and a second structure section, and wherein each of the first structure sections forms part of the first structure, and each of the second structure sections forms part of the second structure.

8. The tower construction according to claim 1, further comprising a cable unit, the cable unit arranged at a lower part of the tower construction, and one or more cables extends from the cable unit towards the nacelle along the second structure.

9. A tower construction for a wind turbine, the wind turbine comprising a set of blades and a nacelle enclosing at least a transmission system and power generating means, the tower construction comprising:
   a first structure being structurally self-supporting and adapted to support the blades, the nacelle and parts enclosed by the nacelle, said first structure defining a longitudinal direction, and said first structure having at least one wall part extending along the longitudinal direction, and
   a second structure substantially enclosed by the first structure and being arranged along the longitudinal direction defined by the first structure and said second structure extending along at least a substantial part of the length of the first structure in the longitudinal direction, the second structure being structurally self-supporting and defining an at least substantially closed space configured to at least substantially enclose one or more parts which need to be moved along the longitudinal direction defined by the first structure,
   wherein the first structure and the second structure are positioned relative to each other in such a manner that no fixed connections between the second structure and the at least one wall part of the first structure are formed; and
   wherein said first structure and said second structure are positioned relative to one another in such a manner that support connections on said second structure just touch an inside surface of said first structure to define abutting contact that does not affect the fatigue limit of said first structure.

10. A tower construction for a wind turbine, the wind turbine comprising a set of blades and a nacelle enclosing at least a transmission system and power generating means, the tower construction comprising:
   a first structure being structurally self-supporting and adapted to support the blades, the nacelle and parts enclosed by the nacelle, said first structure defining a longitudinal direction and having at least one wall part extending along the longitudinal direction, and
   a second structure being structurally self-supporting and adapted to carry one or more components of the wind turbine, said second structure being arranged along the longitudinal direction defined by the first structure, and said second structure extending along at least a substantial part of the length of said first structure in the longitudinal direction,
   wherein said first structure and said second structure are positioned relative to one another in such a manner that support connections on said second structure just touch an inside surface of said first structure to define abutting contact that does not affect the fatigue limit of said first structure.

* * * * *